Patented Aug. 9, 1938

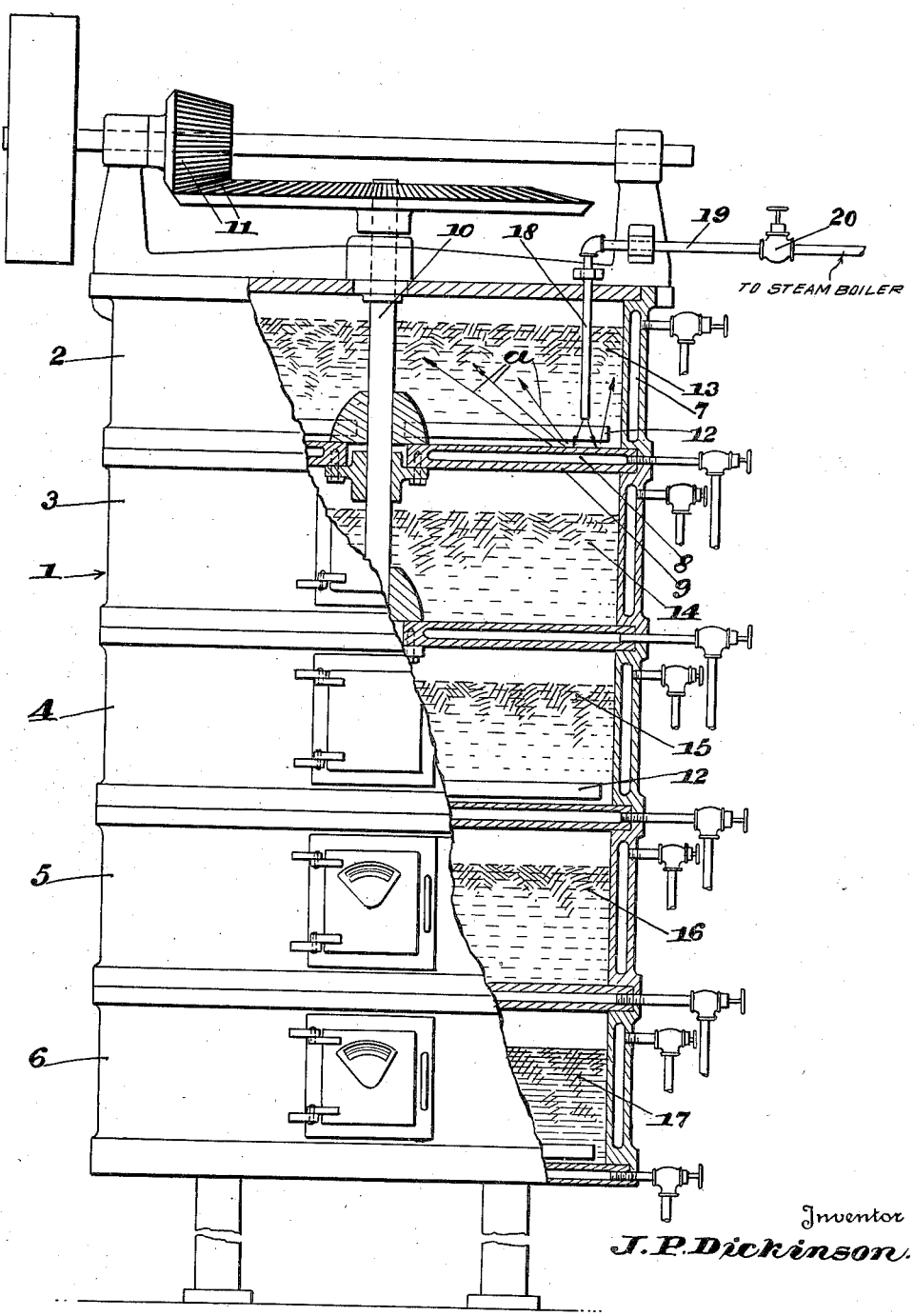

2,126,539

UNITED STATES PATENT OFFICE 2,126,539

PROCESS OF AND APPARATUS FOR EXTRACTING COTTONSEED OIL

James P. Dickinson, Memphis, Tenn.

Application November 12, 1936, Serial No. 110,519

2 Claims. (Cl. 87—6)

This invention relates to improvements in cookers for cotton-seed meats, and its objects are as follow:

First, to so order the steps of a process of treating cotton-seed in the cooking stage as to reduce the refining loss of the crude oil from 50% to 75% over ordinary and known methods of extraction.

Second, to so modify the continuous cooking process of a stack cooker as to enable an immediate and sudden raising of the temperature of the entire batch in the top kettle.

Third, to improve the process of continuously cooking a succession of batches of cotton-seed meats in a stack cooker by introducing hot steam at direct boiler pressure into the incoming cold meats in the first or starting kettle, thereby to suddenly expand the oil cells.

Fourth, to modify any standard stack cooker, whether jacketed or not, by providing a high pressure steam (not superheated) injector for the top kettle, to suddenly heat the top batch of cotton-seed meats and so properly start the cooking operation.

Other objects and advantages will appear in the following specification, reference being had to the accompanying drawing in which the single view is partially sectional and elevational, particularly illustrating the attachment which constitutes the improvement.

The cooker 1 is of a known type, and its principle of operation is the same as that of several other similar cookers which are now on the market. It is deemed unnecessary to go into the details of construction and operation of the cooker 1 for an understanding of the invention, and for that reason the following explanation is quite brief.

There is a series of kettles 2, 3, 4, 5 and 6, superimposed upon each other and annularly steam-jacketed at 7 as well as at 8 in the partitions 9 which divide one kettle from the other and provide successive floors. Steam is admitted to the various jackets by the valve-controlled pipes which lead thereto as shown.

The central shaft 10 is driven by gearing 11 at the top, and in each of the kettles this shaft has paddles 12 which continuously stir the batches of cotton-seed meats 13, 14, 15, 16 and 17. These batches of meats are dumped progressively from one kettle to the other, from top to bottom, and the means by which the dumping is accomplished consists of traps (not shown) in the partitions or floors 9, which traps are operated automatically. Because of the manner of functioning of the traps, the process of cooking in the stack cooker shown is called a continuous process.

This ends the describing of so much of the known cooker which has to be explained for an understanding of the invention, but before touching upon the latter it is thought desirable to state that the mode of conducting the known process is fundamentally at fault because of its heating the batches of cotton-seed meats in the wrong way. Although in isolated instances it has been the practice to inject steam directly into a batch of material to be cooked, yet the current practice in cotton seed cookers is to cook the meats indirectly by the heat from the steam in the wall and floor jackets.

The effect of this procedure is to heat the meats slowly. This is especially true of the top batch 13 according to the current mode. As this batch progresses to the positions of 14, 15, etc., it increases in temperature until it reaches the bottom kettle 6 where it is subjected to the highest cooking temperature.

It has been discovered that this mode is both slow and wasteful. In those instances wherein steam is injected directly into the batch of meats, the practice has been to use super-heated steam. These illustrations make plain the faults of current processes of treating cotton-seed meats. It so happens that according to the first mode the meats will be undercooked, and according to the second mode they will be overcooked. One is as bad as the other because too little heat leaves the meats in a raw state from which the oil cannot be pressed, while too much heat solidifies the oil in the meats.

The invention comprises an extremely simple mechanical contrivance, but the improvement that it makes in the process has been demonstrated as having such merit that a number of cookers, such as illustrated, are being modified in accordance with the principles about to be described. A small upright pipe 18 is introduced into the top kettle 2 substantially as shown. It has been found that the best position for this pipe is 6" from the side wall of the kettle and its outlet 4" from the partition 9. This pipe has a connection 19 which leads directly to a steam boiler, or other source of steam. A valve 20 in the connection 19 enables a control of the steam.

The pipe 18 injects the steam directly into the mass or batch of meats 13. Inasmuch as the outlet of the pipe is fairly close to the partition 9, the latter acts as a baffle, deflecting the steam into and through the entire mass of cotton-seed meats, from the bottom up, as indicated by the arrows $a$. The preferred boiler steam pressure is at 150 to 165 lbs., but a steam pressure as low as 80 lbs. has been discovered to give good results.

By injecting the steam in the manner stated, sudden heat is imparted to the cotton-seed meats. This breaks down the fiber and expands the oil cells. The result is a correct starting of the cooking process, and inasmuch as the batches of cotton-seed meats work from the top to the bottom of the cooker, the top kettle 2 is, obviously, the correct place whereat to apply a relatively high initial cooking temperature.

As the batches are progressively dumped from one kettle to the next, the cooking of the meats continues because of the steam jacketed walls and partitions, until the bottom kettle 6 is reached. Here the batch of meats 17 is kept at 228° F. This is somewhat higher than the initial cooking temperature, but is much lower than the prevailing temperature in known stack cookers. The result of adhering to the 228° F. temperature in the bottom kettle 6 is to make the latter what might be called a simmering kettle.

By merely simmering the batch of meats before its final discharge into the cotton-seed press (not shown) the meats are prevented from being overcooked. The latter is a danger which partly defeats the very purpose of cooking as has been brought out already.

Briefly summarizing the operation, it is assumed that the cooker 1 is cold and empty. Steam is admitted to the jacketed walls and partitions of the series of kettles in order to heat up the cooking compartments to a temperature of approximately 235° F. The meats when conveyed from the crusher rolls to the cooker are cold. A quantity is discharged into the top cooker 2 until the latter is filled.

Then live steam at boiler pressure is turned on at the valve 20, injecting the live steam into the mass of meats, close to the bottom 9, whence it is deflected into the entire batch. This suddenly raises the temperature of the erstwhile cold meats, and the initial batch is at once made ready for the succeeding cooking steps. These are accomplished as the initial batch is dumped from one kettle to the other. Fresh batches of cold meats are introduced into the top kettle 2 as soon as a preheated batch is discharged. The top kettle must be kept full or virtually so.

The meats are dumped progressively from one kettle to the other until all of the kettles are full. It requires about one and a half hours to cook a cooker full of meats. When the meats in the bottom kettle 6 have simmered either the required length of time or as long as desired, the batch is discharged at the bottom and a new batch is introduced at the top. The dumping and discharging acts occur continuously, and are automatic when the operation of the cooker is once started.

It has been pointed out that the bottom kettle 6 is kept at a temperature of 228° F. The temperature should not vary a great deal either up or down from this point. The meats merely simmer and the idea is to prevent their losing heat. From what has been stated above, it will be understood that in carrying out the process three main things are necessary: First, keep the cooker full of meats; second, turn on the steam and leave it on; and, third, keep the temperature in the bottom kettle at approximately 228° F.

It has been discovered that by carrying out this process, principally by injecting hot steam at boiler pressure directly into the initial batch at the top of a stack cooker, oil made from the cooked seed will show a refining loss of only 2%, whereas when the seed is cooked according to the known process, the oil will show a refining loss as high as 7% from seed of the identical character. Thus the process enables a notable increase in the quantity of refinable oil.

I claim:

1. The herein described process consisting of dumping a batch of cold cotton-seed meats into the top kettle of a heated stack cooker, injecting steam directly into said batch of cold meats at a point near the bottom and adjacent to the outer wall of the top kettle only so as to deflect and disseminate the steam throughout the entire batch and suddenly raise its temperature, continuously cooking said batch by indirect heat only while traversing succeeding kettles, and maintaining the temperature of said batch at approximately 228° F. in the last kettle prior to its discharge from the cooker.

2. Apparatus for use in extracting cotton-seed oil comprising a stack cooker which includes a series of steam-jacketed kettles each of which has a steam jacketed floor, a plain-ended steam pipe fixed in the top kettle at approximately 6″ from the wall of said kettle and having its outlet spaced approximately 4″ from the respective floor so that steam discharged at said outlet will strike the floor and be deflected into the batch of cotton-seed meats, and a paddle revoluble in said top kettle adjacent to the respective floor to periodically pass through the space between said pipe-end and floor.

JAMES P. DICKINSON.